United States Patent [19]

Sanders et al.

[11] 4,369,737

[45] Jan. 25, 1983

[54] HYDROGEN-OXYGEN GENERATOR

[76] Inventors: Cledith A. Sanders; Margaret M. Sanders; Cledith A. Sanders, II, all of 7391 Wending Ct., S., Jacksonville, Fla. 32210

[21] Appl. No.: 155,788

[22] Filed: Jun. 2, 1980

[51] Int. Cl.³ .................................................. F02B 43/08
[52] U.S. Cl. ...................................... 123/3; 123/1 A; 123/DIG. 12; 204/129; 204/278
[58] Field of Search ................... 123/1 A, 3, DIG. 12, 123/536; 204/129, 278, 266

[56] References Cited

U.S. PATENT DOCUMENTS

| | | | |
|---|---|---|---|
| 2,384,463 | 9/1945 | Gunn et al. | 123/DIG. 12 |
| 2,509,498 | 5/1950 | Heyl | 123/DIG. 12 |
| 3,311,097 | 3/1967 | Mittelstaedt | 123/DIG. 12 |
| 3,335,078 | 8/1967 | Mehl | 204/129 |
| 3,459,953 | 8/1969 | Hughes et al. | 123/DIG. 12 |
| 3,648,668 | 3/1972 | Pacheco | 123/DIG. 12 |
| 3,980,053 | 9/1976 | Horvath | 123/3 |
| 4,023,545 | 5/1977 | Mosher et al. | 123/536 |
| 4,170,200 | 10/1979 | Takeuchi et al. | 123/DIG. 12 |

Primary Examiner—Charles J. Myhre
Assistant Examiner—E. Rollins Cross
Attorney, Agent, or Firm—Arthur G. Yeager

[57] ABSTRACT

A cell for generating hydrogen and oxygen comprised of a plastic housing and a plurality of regularly spaced metallic electrode rods positioned substantially parallel to the bottom of the housing; an aqueous solution of sodium bi-sulfate in which the rods are immersed; half of the rods being positive and attached to a source of D.C. electricity and the other half of the rods being negative and attached to a ground connection; the rods being positioned alternately such that each positive rod is adjacent solely to negative rods and each negative rod is adjacent solely to positive rods. This cell finds particular use as a fuel generator for internal combustion engines.

12 Claims, 4 Drawing Figures

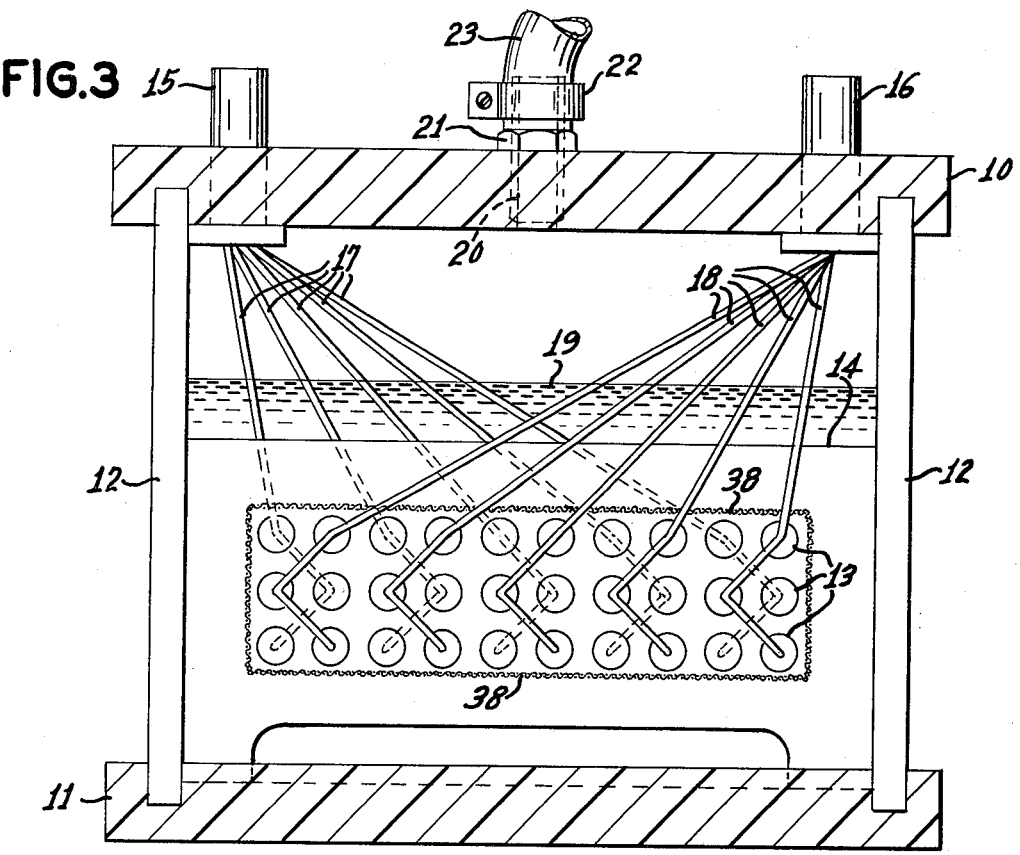
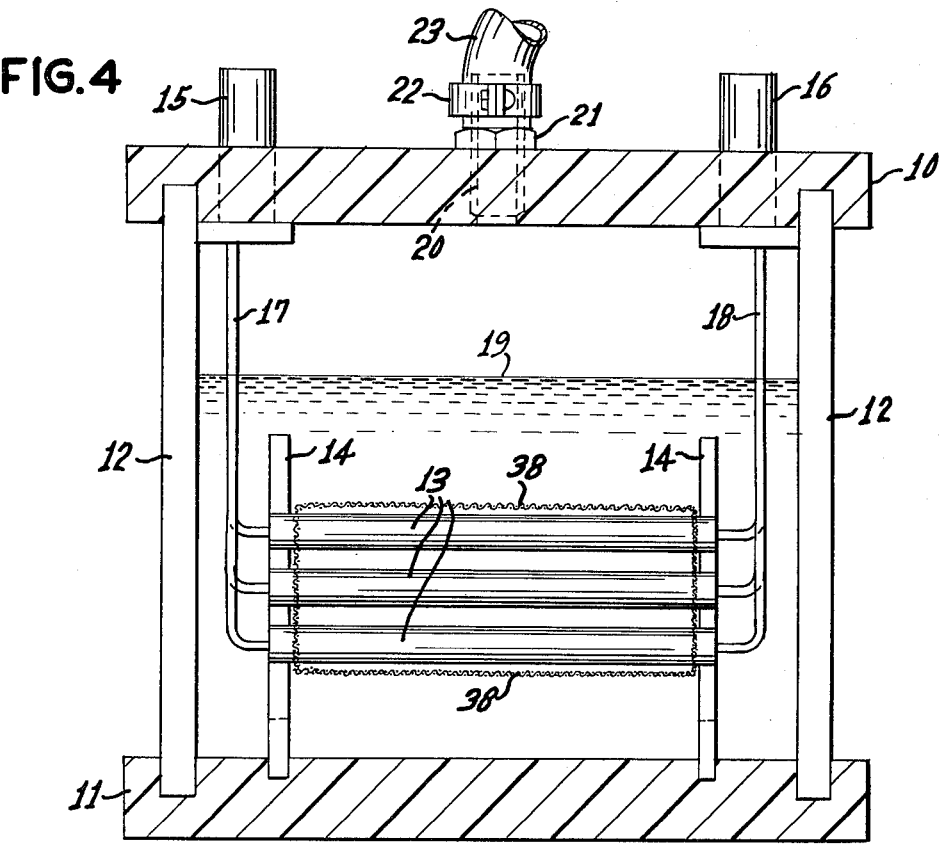

HYDROGEN-OXYGEN GENERATOR

BACKGROUND OF THE INVENTION

A considerable amount of research and development has been directed at improvements for internal combustion engines. In recent times an increasing amount of effort has been directed toward the development of fuel which is not totally derived from petroleum. One such fuel which has received a small amount of attention in the past is hydrogen, but the cost of producing hydrogen has been a major obstacle in pursuing this course of action. There have been some attempts in this regard as evidenced by the disclosures in the U.S. Pat. Nos. 3,311,097; 3,980,053; and 4,023,545. These patents teach the use of an electrolytic cell for making combustible mixtures of hydrogen and oxygen from water, and using this mixture of gases as fuel for the engine. For various reasons the cells of these disclosures have not been efficient and therefore have not been widely used in engines in modern times. Nevertheless, this is a fruitful area for development work because of the large energy potential in the burning of hydrogen which does not produce air pollution. Accordingly, it is an object of this invention to provide an improved cell for generating hydrogen and oxygen mixtures that may be used as the fuel for internal combustion engines.

BRIEF SUMMARY OF THE INVENTION

This invention provides a cell for generating hydrogen and oxygen which comprises a nonconductive housing; a plurality of regularly spaced electrode rods parallel to the bottom of the housing; an aqueous electrolyte solution, preferably sodium bi-sulfate, in sufficient amount to immerse all of said electrode rods; one half of said rods being positive and conductively attached to a source of direct current electricity and the other half of said rods being negative and conductively attached to a ground; said rods being positioned such that each positive electrode rod is adjacent solely to negative electrode rods and each negative electrode rod is adjacent solely to positive electrode rods. In a specific embodiment of this invention the rods are lead and are positioned in a plurality of horizontal rows, each row being spaced vertically from an adjacent row. In a specifically preferred embodiment the electrode rods are approximately six inches long and are carried in a housing of polyethylene in which the electrolyte is an aqueous solution of sodium bi-sulfate.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a front cross-sectional view taken along 3—3 of FIG. 2.

FIG. 4 is a side cross-sectional view taken along 4—4 of FIG. 2.

DETAILED DESCRIPTION OF THE INVENTION

Figure 2:
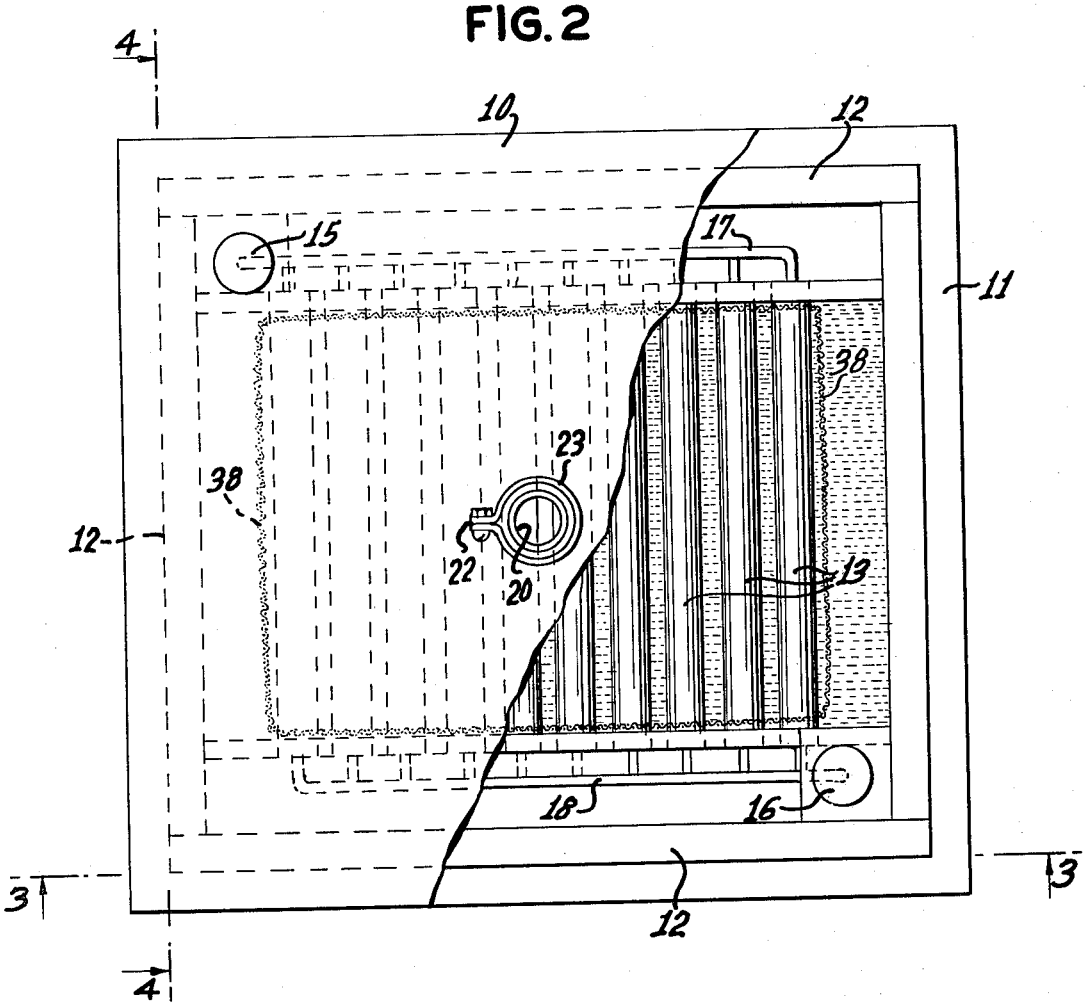
FIG. 2 is a top plan view of the cell of this invention.

With specific reference to FIGS. 2, 3, and 4, the cell of this invention may be best understood. In general, the cell is a closed housing containing metallic electrode rods and a liquid electrolyte with the electrodes being connected to either of two terminal posts similar to an electric storage battery employed in automobiles. The cell of this invention is not, however, designed to store electricity, but rather to use electricity in the production of a mixture of hydrogen and oxygen gases by electrolysis of the aqueous electrolyte solution in the cell. An exit port is provided in the housing of the cell to conduct the mixture of hydrogen and oxygen gases away from the cell for whatever purposes these gases my serve. In a particular embodiment of this invention these gases will be conducted into the intake manifold of an internal combustion engine.

The housing of the cell of this invention comprises as upper wall 10, a lower wall 11, and four side walls 12. These walls may be joined in any fashion suitable in the preparation of a liquid-tight and gas-tight housing. The material of the housing may be any material which is sufficiently strong and resistant to the corrosion produced by an electrolysis process. It is preferred that the material of the housing be a suitable plastic because of its low density and corrosion-resistance. Polyethylene is well suited for this purpose and is the preferred material of construction. Such a plastic may be fabricated into the housing by a tongue-and-groove construction as shown in these drawings and made into a rigid structure by a suitable adhesive of the same plastic material or by heat welding. Furthermore, since this material is reasonably transparent, the condition of the interior parts of the cell may be readily seen.

Inside of the housing is a plurality of metallic electrode rods 13 arranged to produce the desired electrolysis. The electrode rods 13 are placed in a plurality of layers parallel to lower wall 11 of the housing. In order for the cell to function efficiently electrode rods 13 must be regularly spaced from each other in the same layer and from other electrode rods in adjacent layers. This preferred arrangement of electrode rods 13 is accomplished by means two parallel upright supports 14 which have been machined with suitable holes in a predetermined spaced pattern such that both ends of an electrode rod 13 fit snugly into holes in supports 14. It is desirable to employ polyethylene for supports 14 since this is an excellent insulating material. It is also preferable that electrode rods 13 be made of lead, rather than a precious metal, since lead will not deteriorate over many years of use. It is preferable for rods 13 to be in the form of cylinders.

Each electrode rod 13 is fitted at one end thereof with an insulated electrically conductive wire 17 or 18 of sufficient length to be connected to an appropriate terminal post 15 or 16 as maybe seen in FIG. 3. Half of the electrodes 13 are connected to terminal post 15 and the other half of electrodes 13 are connected to terminal post 16. In order for the electrolysis reaction to function properly a direct current must be imposed upon the electrode rods 13 such that half of them are positive and the other half are negative. Thus terminal post 15 may be connected to a positive source of direct current and terminal post 16 may be connected to a ground in order to complete the circuit. Each electrode rod 13 connected to terminal post 15 will then become a positive electrode and each electrode rod 13 connected to terminal post 16 will become a negative electrode. It is important that each positive electrode have only negative electrodes adjacent to it, and similarly, each negative electrode have only positive electrodes adjacent to it. Accordingly, it will be seen from FIG. 3 that electrodes 13 are arranged alternately (positive-negative-positive-negative etc.). The arrangement of electrodes 13 in the next layer is also in the same alternating pattern within that layer, and is so positioned that any given electrode 13 has the opposite sign (positive or negative) from that of electrodes 13 on either side of it in the same layer and from that of electrodes 13 immediately above and below it in different layers. This arrangement permits maximum use of the surface of each electrode 13 to generate hydrogen and oxygen.

The arrangement of electrode rods 13 is totally immersed in aqueous electrolyte solution. The level of this solution is shown at 19 to be sufficient to cover all electrode rods 13 and to leave an adequate space above the electrolyte for the collection of the mixture of hydrogen and oxygen which is generated in the cell. The direct current arrangement, as described above, causes the water in the electrolyte to be decomposed into a mixture of hydrogen and oxygen in the proportion of two volumes of hydrogen for each single volume of oxygen. It is well known that such a mixture can be burned to produce water vapor. Although water can be used by itself for the electrolyte, it is preferred to dissolve a small amount of a substance in the water to provide better electrical conductivity. The most desirable of such substances is sodium bi-sulfate and it is used as a fully concentrated solution in distilled water. As water is decomposed by the production of hydrogen and oxygen, water must be added to replace the loss, but the sodium bi-sulfate is not used up in the process.

In upper wall 10 there is located an outlet port 20 permit the gases produced in the cell to be conducted away for other uses. In the illustration shown in these drawings exit port 20 is fitted with coupling 21 which is screwed tightly into a threaded hole in wall 10. Flexible tubing 23 fits over upper the end of coupling 21 and is held in place with a suitable clamp 22. Any other type of exit port and arrangement to conduct the gases away from that port is suitable so long as it will contain the hydrogen and oxygen mixture under whatever pressures are involved.

It has been found to be desirable for more efficient production of hydrogen and oxygen to wrap the arrangement of electrode rods 13 with a netting 38 of an insulating plastic. The openings in the netting may be $\frac{1}{8}$ to $\frac{1}{4}$ inch in size. It appears that netting 38 enhances the production of gas by collecting the small gas bubbles and causing them to coalesce into larger gas bubbles which rise quickly to the top of the electrolyte and escape from the electrolyte to be directed into exit port 20.

Figure 1:
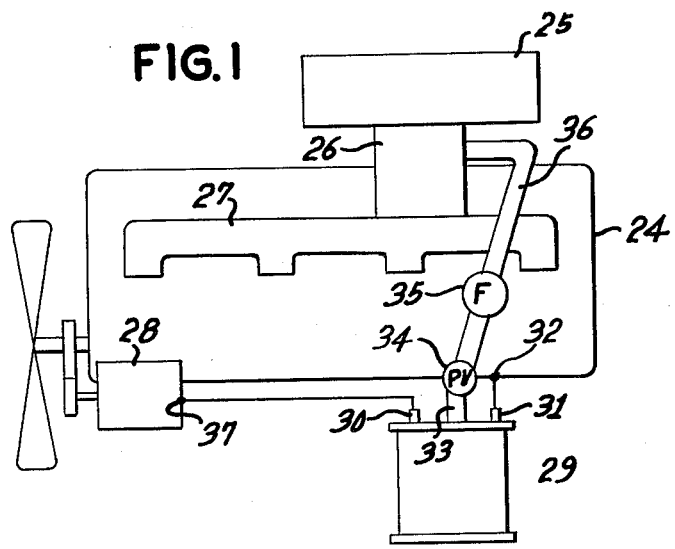
FIG. 1 is a schematic illustration of the cell of this invention employed as an accessory of an internal combustion engine.

In FIG. 1 there is shown the principal use for the generator of this invention as an accessory of an internal combustion engine. Engine 24 is fitted with carburetor 26 having an intake air filter 25. The fuel mixture leaving carburetor 26 passes into intake manifold 27 which distributes the fuel mixture to each of the cylinders (four shown here) of the engine.

Cell 29 has conduit 36 joining outlet port 33 or cell 29 with carburetor 26. It is desirable that in conduit 36 there be a pressure valve 34 which remains closed until the pressure of the hydrogen and oxygen generated in cell 29 reaches at least 0.5 psi. When that pressure is reached pressure valve 34 opens to permit the mixture of gases to be fed into carburetor 26. It is also desirable that in conduit 36 there be a filter 35 to remove any unwanted acidic vapors that might be corrosive to the engine. Filter 35 contains soda lime which is a mixture of sodium hydroxide and calcium oxide. Although it is not shown in FIG. 1 there may be included in the operator's controls a means to reduce the input of petroleum fuel to carburetor 26 as the output of hydrogen and oxygen from cell 29 increases and reaches a maximum. If cell 29 is sufficiently large with respect to the combustion volume of engine 24 the output of cell 29 can provide the full fuel capacity for engine 24. The energy needed to operate cell 29 may be provided by electric generator or alternator 28 of engine 24. The positive terminal 30 of cell 29 is connected to output terminal 37 of generator of alternator 28, and the negative terminal 31 of cell 29 is attached to a suitable ground connection 32 of engine 24.

The hydrogen and oxygen generator of this invention finds its principal use in generating fuel for an internal combustion engine as described above. There are other uses for the device of this invention, such as the production of fuel for cutting and welding torches, the production of hydrogen and oxygen for use in laboratory experiments, etc.

This cell may be made in any of a variety of sizes. It may be helpful to understand the size which can be employed in an ordinary four-cylinder automobile engine. For such a purpose electrode rods 13 may be $\frac{1}{2}$ inch in diameter and six inches long placed in three layers (ten rods in each layer) with the spacing between rods in the same layer and the spacing between rods in adjacent layers being $\frac{1}{4}$ inch. If rod supports 14 are $\frac{1}{4}$ inch in thickness, thus covering a total of $\frac{1}{2}$ inch of the length of each rod 13, the total surface area of all 30 electrode rods 13 is 259 square inches. The exhaust of an engine operating with this fuel is substantially all water vapor which will not pollute the atmosphere and will not produce the haze and smog found in major population centers.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A cell for generating hydrogen and oxygen which comprises a nonconductive gas-tight housing having a hydrogen and oxygen exit port adjacent the top of said housing; a plurality of regularly spaced parallel elongated metallic electrode rods positioned substantially parallel to the bottom of said housing; means for supporting said electrode rods within said housing in a plurality of horizontal rows with each of said rows being spaced vertically from each other and with their ends being in spaced vertical planes; an aqueous electrolyte immersing all of said electrode rods; means for interconnecting one half of said rods at their ends in one said plane to a source of direct current electricity to render same positive and for interconnecting the other half of said rods at their ends in the other said plane to ground to render same negative; said rods being positioned such that each said positive electrode rod is adjacent solely to said negative electrode rods and each said negative electrode rod is adjacent solely to said positive electrode rods.

2. The cell of claim 1 wherein said electrode rods are lead.

3. The cell of claim 1 wherein said plurality of electrode rods is encircled by a nonconductive netting having openings of $\frac{1}{8}$ to $\frac{1}{4}$ inch for collecting small gas bubbles being produced and causing same to coalesce into larger gas bubbles which quickly rise through and escape from said electrolyte.

4. The cell of claim 2 wherein said rods are approximately 0.5 inch in diameter and each rod is spaced from adjacent rods by a distance of $\frac{1}{8}$ to $\frac{1}{4}$ inch.

5. The cell of claim 1 wherein said aqueous electrolyte is an aqueous solution of sodium bi-sulfate.

6. An accessory system to an internal combustion engine comprising a cell for generating hydrogen and oxygen gas to be burned in said engine after being introduced into the carburetor of the engine, said cell comprising a nonconductive gas-tight housing having a hydrogen and oxygen exit port adjacent the top of said housing; a plurality of regularly spaced parallel metallic electrode rods positioned substantially parallel to the bottom of said housing; means for supporting said electrode rods within said housing in a plurality of horizontal rows with each of said rows being spaced vertically from each other and with their ends being in spaced vertical planes; an aqueous electrolyte immersing all of said electrode rods; means for interconnecting at their said ends in one said plane one half of said rods to a source of direct current electricity to render same positive and for interconnecting the other half of said rods at their ends in the other said plane to ground to render same negative; said rods being positioned such that each positive electrode rod is adjacent solely to said negative electrode rods and each negative electrode rod is adjacent solely to said positive electrode rods; said plurality of electrode rods being encircled by at least one layer of nonconductive netting having openings of $\frac{1}{8}$ to $\frac{1}{4}$ inch for collecting small gas bubbles being produced and causing same to coalesce into larger gas bubbles which quickly rise through and escape from said electrolyte; and a conduit attached to said exit to conduct a mixture of hydrogen and oxygen gas from said cell to said carburetor.

7. The accessory system of claim 6 which additionally comprises in said conduit intermediate said cell and said carburetor a filter for removing acidic materials from said gaseous mixture of hydrogen and oxygen.

8. The accessory system of claim 7 wherein said filter comprise a mass of granular soda lime through which said mixture of hydrogen and oxygen passes.

9. The accessory system of claim 7 which additionally comprises a pressure valve in said conduit which opens to permit the passage of said gaseous mixture of hydrogen and oxygen to said carburetor when the pressure of said gaseous mixture is at least 0.5 psi.

10. The accessory system of claim 6 wherein said aqueous electrolyte is a saturated solution of sodium bi-sulfate in water.

11. The accessory system of claim 10 wherein said electrode rods are lead.

12. The accessory system of claim 5 wherein said electrode rods are lead.

* * * * *